(12) United States Patent
Fujita et al.

(10) Patent No.: US 7,044,551 B2
(45) Date of Patent: May 16, 2006

(54) SEAT STRUCTURE

(75) Inventors: Etsunori Fujita, Hiroshima (JP);
Kazuyoshi Chizuka, Hiroshima (JP);
Seiji Kawasaki, Hiroshima (JP);
Yasuhide Takata, Hiroshima (JP);
Yumi Ogura, Hiroshima (JP); Eiichi Yasuda, Owariasahi (JP); Shun'ichi Doi, Nagoya (JP); Kazukata Takei, Nishikamo-gun (JP)

(73) Assignee: Delta Tooling Co., Ltd., Hiroshima (JP)

( * ) Notice: Subject to any disclaimer, the term of this patent is extended or adjusted under 35 U.S.C. 154(b) by 73 days.

(21) Appl. No.: 10/767,090

(22) Filed: Jan. 29, 2004

(65) Prior Publication Data

US 2004/0212234 A1 Oct. 28, 2004

(30) Foreign Application Priority Data

Jan. 31, 2003 (JP) ............................. 2003-023177

(51) Int. Cl.
*A47C 3/025* (2006.01)
*A47C 7/02* (2006.01)

(52) U.S. Cl. .............................. 297/284.4; 297/284.2; 297/452.56

(58) Field of Classification Search ............. 297/284.4, 297/284.2, 452.56
See application file for complete search history.

(56) References Cited

U.S. PATENT DOCUMENTS

| | | | | |
|---|---|---|---|---|
| 2,964,099 A * | 12/1960 | Panicci | ................... | 297/354.1 |
| 3,258,259 A * | 6/1966 | Bohlin | .................. | 267/89 |
| 4,159,847 A * | 7/1979 | Arai | ...................... | 297/284.4 |
| 4,295,681 A * | 10/1981 | Gregory | ................. | 297/284.4 |
| 4,296,965 A * | 10/1981 | Sakurada et al. | ........ | 297/284.4 |
| 4,564,235 A * | 1/1986 | Hatsutta et al. | .......... | 297/284.4 |
| 4,588,172 A * | 5/1986 | Fourrey et al. | ............... | 267/89 |
| 4,627,661 A * | 12/1986 | Ronnhult et al. | ........ | 297/284.4 |
| 4,712,834 A * | 12/1987 | Warrick | ................... | 297/284.2 |
| 4,880,271 A * | 11/1989 | Graves | ..................... | 297/284.4 |
| 4,896,918 A * | 1/1990 | Hoshihara | ................ | 297/284.4 |
| 4,940,284 A * | 7/1990 | Nagasaka | ................. | 297/284.4 |
| 5,044,693 A * | 9/1991 | Yokota | .................. | 297/452.18 |
| 5,423,593 A * | 6/1995 | Nagashima | ............... | 297/284.4 |
| 5,697,672 A * | 12/1997 | Mitchell | .................. | 297/284.4 |
| 5,884,977 A * | 3/1999 | Swamy et al. | ......... | 297/452.52 |
| 6,499,803 B1 * | 12/2002 | Nakane et al. | ........... | 297/284.4 |
| 6,644,752 B1 * | 11/2003 | Takata | .................... | 297/452.56 |
| 2002/0096932 A1 | 7/2002 | Fujita et al. | | |
| 2003/0085600 A1 * | 5/2003 | Mori | ....................... | 297/284.4 |
| 2004/0130202 A1 * | 7/2004 | Kawasaki | .............. | 297/452.56 |

FOREIGN PATENT DOCUMENTS

GB 2059497 A * 4/1981
JP 2002177099 6/2002

* cited by examiner

*Primary Examiner*—Peter M. Cuomo
*Assistant Examiner*—Sarah C. Burnham
(74) *Attorney, Agent, or Firm*—Steinberg & Raskin, P.C.

(57) ABSTRACT

A seat structure includes a torsion bar 40 disposed along the width direction in the vicinity of the bottom end of a back frame 20, a pelvis supporting plate 50 is connected to the torsion bar 40, and a flat-type supporting member 60 for the seat back is engaged with the vicinity of the bottom end of the pelvis supporting plate 50 and strained. Slack of the flat-type supporting member 60 can be eliminated by the pelvis supporting plate 50 to enhance the appearance. Further, a vibration inputted from the seat back side, and vibrates as if patting on the back of the human body can be absorbed by an elastic force of the torsion bar 40.

12 Claims, 17 Drawing Sheets

F I G. 1
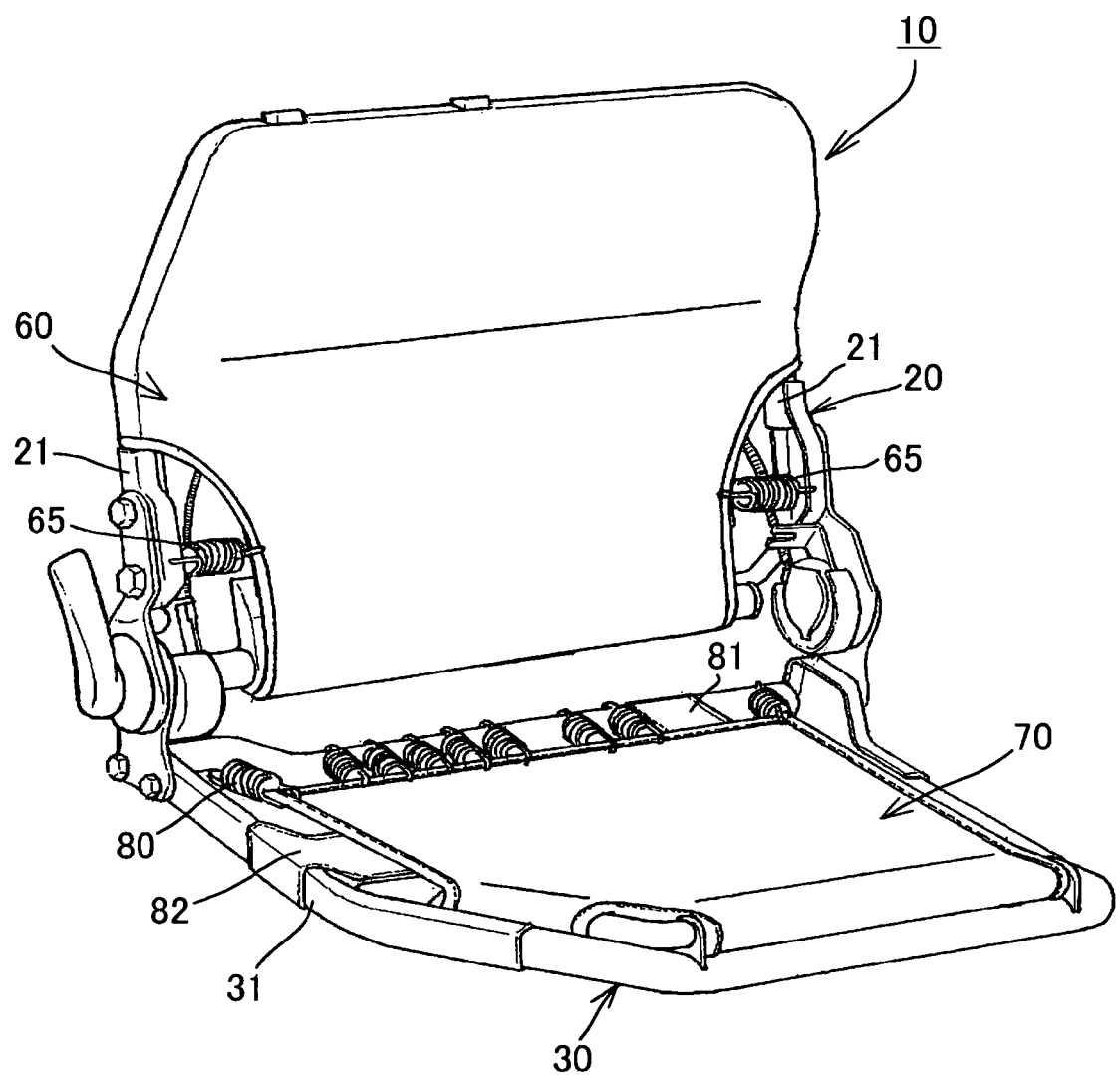

F I G. 2
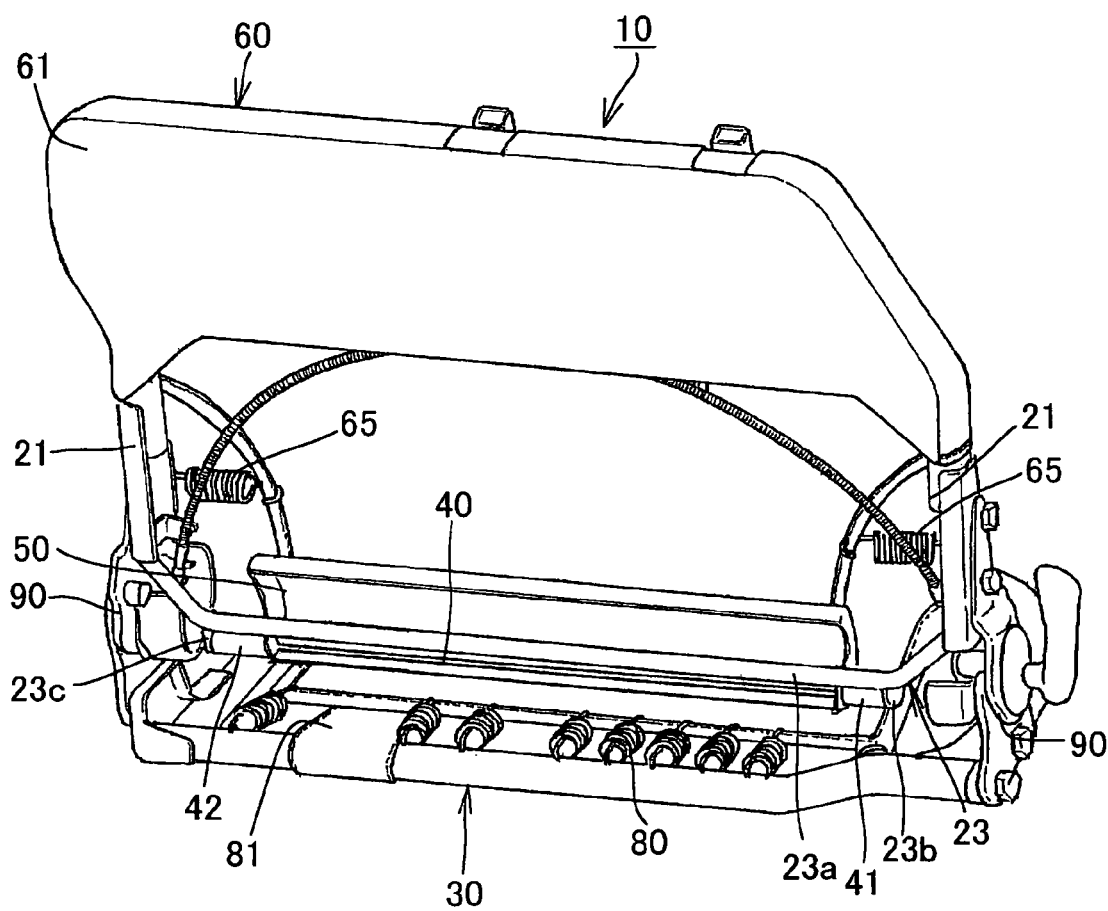

F I G. 1 0
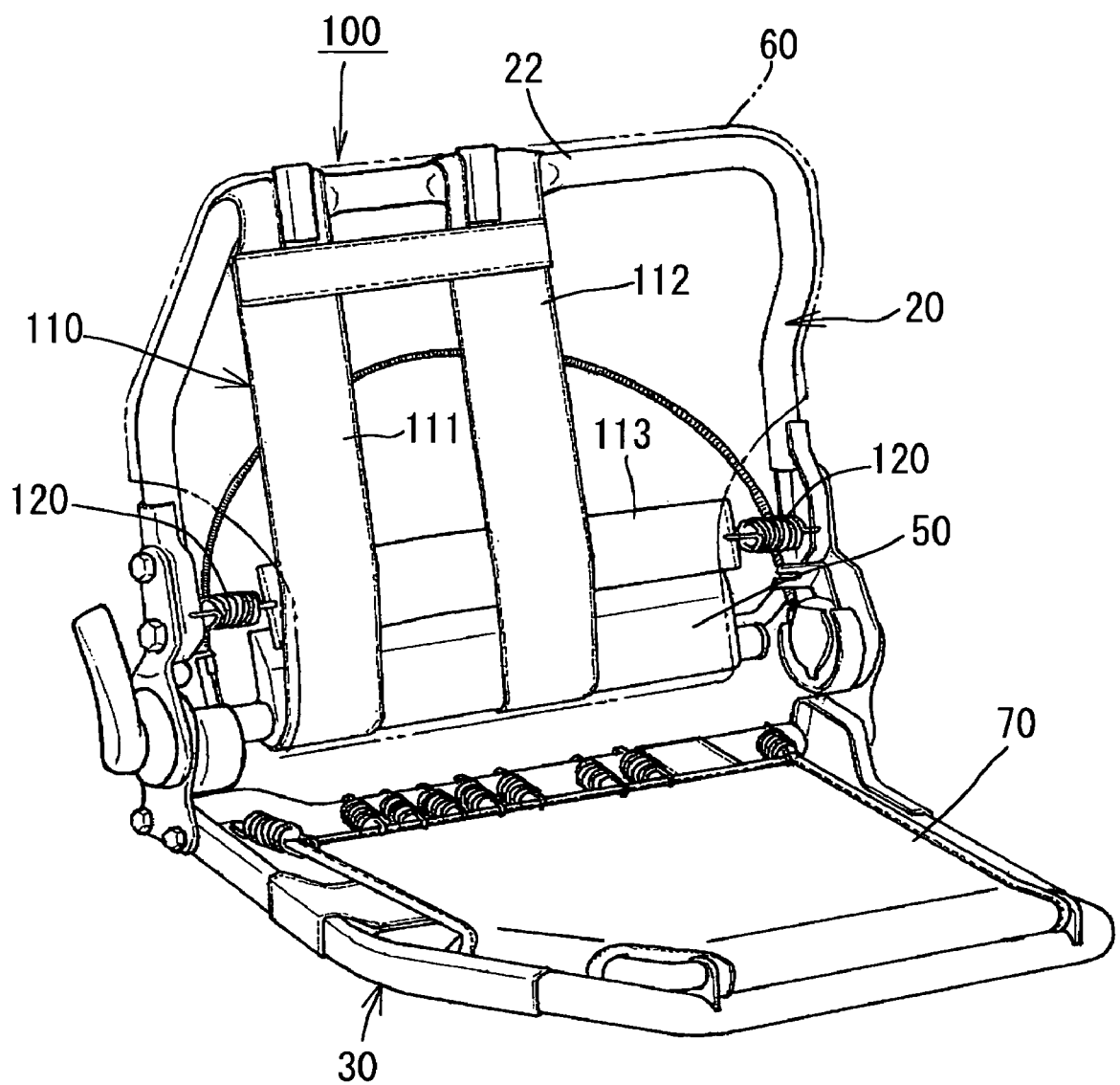

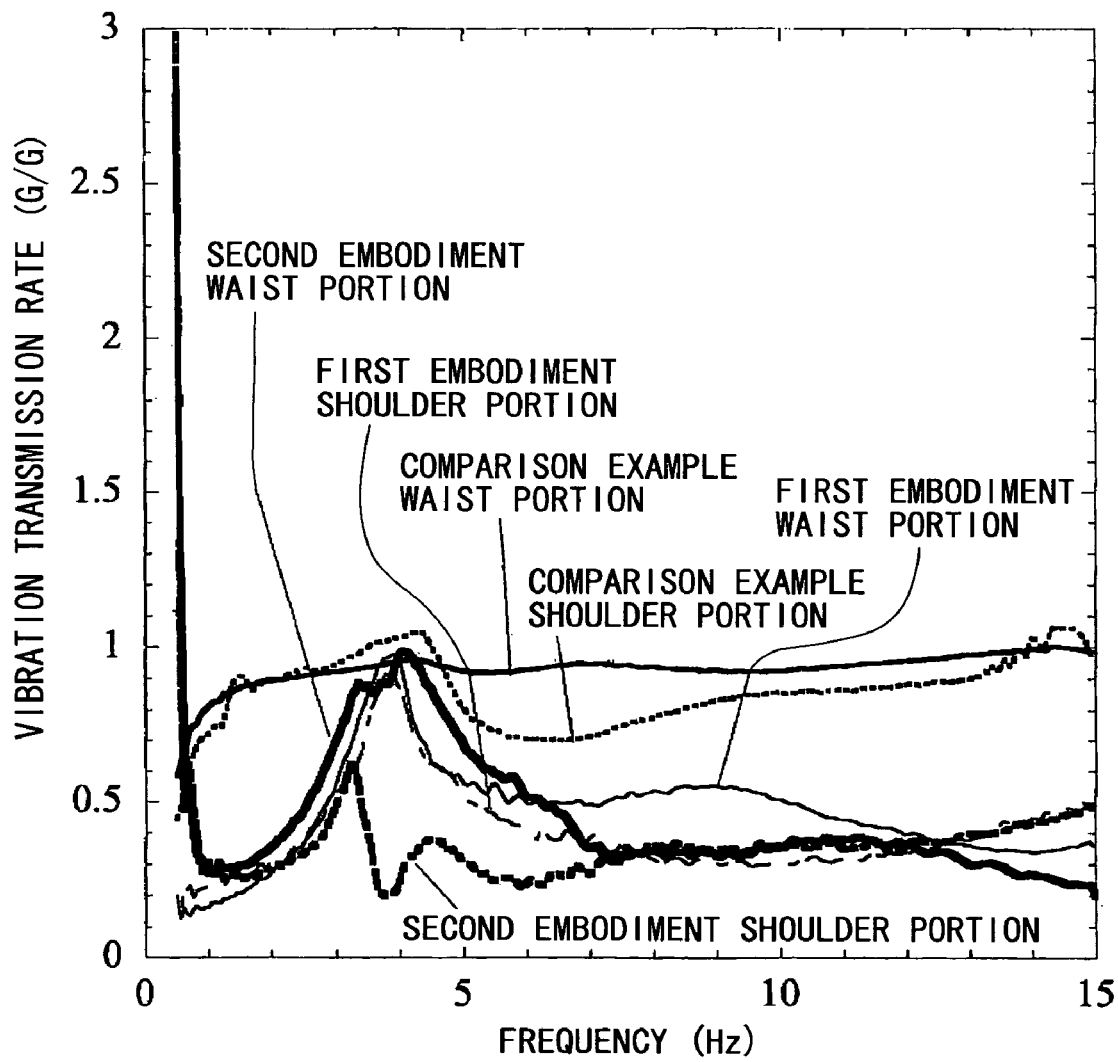

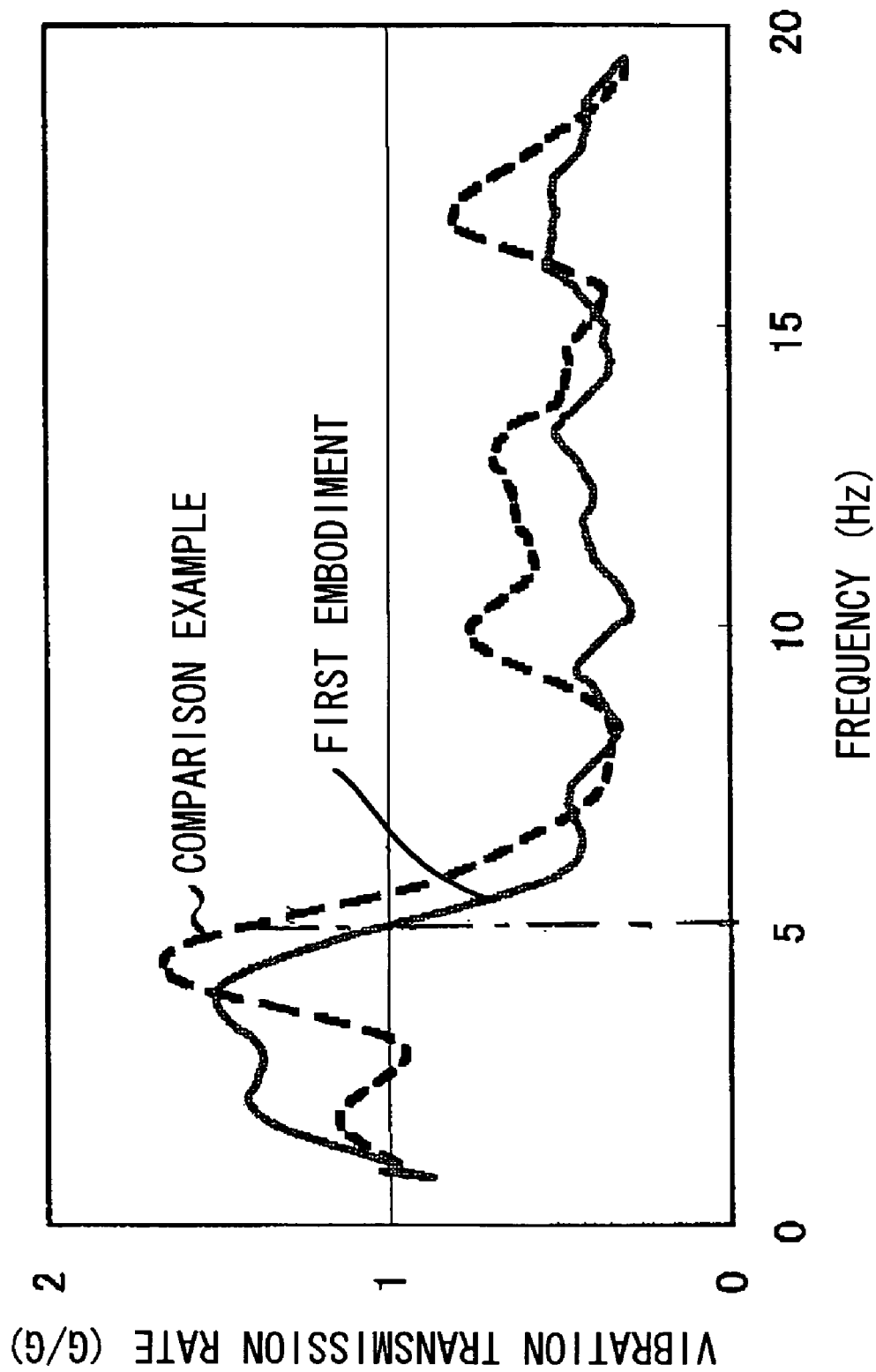

SEAT STRUCTURE

BACKGROUND OF THE INVENTION

1. Field of the Invention

The present invention relates to a seat structure, to be in more detail, a seat structure suitably used for a seat of a transportation equipment such as a plain, train, ship, fork lift and automobile.

2. Description of the Relevant Art

A vehicle seat which uses a three-dimensional net member (solid knitted fabric) as a cushioning layer is disclosed, for instance, in a patent document 1 (Japanese Patent Laid-open No. 2002-177099). Namely, the three-dimensional net members are strained on a back frame and a cushion frame forming a seat back and a seat cushion respectively Since the vehicle seat disclosed in the patent document 1 uses a three-dimensional net member, it has sufficient cushionability though it is thin, and is excellent in air permeability. However, in the vehicle seat disclosed in the patent document 1, a seat cushion is provided with a vibration absorbing function by arranging a flat-type supporting member supported by a coil spring on a bottom portion of the three-dimensional net member, but a vibration absorption measure on the seat back side is not regarded as important so much. Further, since the three-dimensional net member provided on the seat back is strained at a low tension, it sometimes makes an impression to have a slight slack in the vicinity corresponding to the waist portion of a seated person, which makes a problem in appearance. Further, since it is structured that the three-dimensional net member is strained on the back frame and the cushion frame like a hammock, it often gives a feeling of receiving a lateral pressure on a side portion of the body or a feeling of forward slippage of the haunches when seated.

SUMMARY OF THE INVENTION

The present invention has been made in consideration of the circumstances described above, and a problem to be solved is to provide a seat structure capable of improving vibration absorbency and appearance more than those obtained by the prior art when using a cushioning layer as a tension structure provided by straining a member such as a three-dimensional net member (a two-dimensional net member, a thin urethane member, or the like) on frames. Further, the present invention is to provide a seat structure capable of reducing a hammock-like feeling such as a feeling of receiving a lateral pressure on a side portion of the body or a feeling of forward slippage generated, by providing a cushioning layer as a tension structure by means of providing members to support the side portion of the upper body and to prevent the forward slippage of the pelvis portion so that posture keeping ability and body pressure dispersibility can be further improved.

In order to solve the above-described problem, provided is a seat structure including a back frame and a cushion frame, the seat structure comprising:

a flat-type supporting member for the seat back supported by the back frame;

a tension adjusting mechanism for adjusting a tension of the flat-type supporting member for the seat back; and a flat-type supporting member for the seat cushion elastically supported by the cushion frame separately from the aforementioned flat-type supporting member for the seat back.

The aforementioned tension adjusting mechanism described in claim 2 of the present invention includes: a torsion bar disposed in the vicinity of a bottom end of the back frame along the width direction of the back frame; and a pelvis supporting plate composed of a plate member having predetermined width and length, connectedly disposed with the torsion bar, positioned in the rear of the pelvis of a seated person, and enforced in a direction pushed forward in a normal state, the aforementioned flat-type supporting member for the seat back is engaged with the vicinity of a bottom end of the pelvis supporting plate at the bottom end thereof, and strained vertically on the back frame by an elastic force of the torsion bar.

The aforementioned torsion bar is connected to the vicinity of the bottom end of the pelvis supporting plate.

The aforementioned pelvis supporting plate is formed in a curved shape protruding backward at nearly central portion thereof in the width direction.

At least a portion of the pelvis supporting plate is formed of synthetic resin, a three-dimensional net member, a two-dimensional net member, or rubber.

Coil springs are provided between respective side portions corresponding to the waist portion of a seated person on the flat-type supporting member for the seat back and respective side frames forming the back frame to pull the respective side portions corresponding to the waist portion toward respective side frames.

A fabric spring is connected to an upper end of the flat-type supporting member for the seat back and hung on the upper frame forming the back frame and the end portion of the fabric spring is fixed to the flat-type supporting member for the seat back on the back face side.

The aforementioned flat-type supporting member for the seat cushion is engaged with a front frame forming the cushion frame at the front end portion thereof, and elastically supported by a rear frame forming the cushion frame via spring members at the rear end portion thereof, and the spring members act as a tension adjusting mechanism of the flat-type supporting member for the seat cushion.

The aforementioned spring member is a coil spring or a torsion bar connected to a rear end portion of the flat-type supporting member for the seat cushion and supported by a rear frame forming the cushion frame.

A first band member for the seat cushion is provided in layers at nearly central portion from front to back along the width direction on the back face of the flat-type supporting member for the seat cushion, and connected to the vicinity of one side portion of the flat-type supporting member for the seat cushion at one end, and engaged with a side frame corresponding to the other side portion of the flat-type supporting member for the seat cushion at the other end.

A second band member for the seat cushion is provided in layers in the vicinity of one side portion of the flat-type supporting member for the seat cushion in the direction from front to back, and connected to the vicinity of the front portion of the flat-type supporting member for the seat cushion at least at one end and engaged with the rear frame at the other end, so that a setting height of the flat-type supporting member for the seat cushion is maintained at a predetermined height.

The setting height of one side portion of the flat-type supporting member for the seat cushion is higher than that of one side frame corresponding to the one side portion of the flat-type supporting member for the seat cushion, owing to being supported by the second band member for the seat cushion.

A second band member for the seat cushion is provided in layers in the vicinity of one side portion of the flat-type supporting member for the seat cushion in the direction from front to back, and connected to the vicinity of the front portion of the flat-type supporting member for the seat cushion at least at one end and engaged with the rear frame at the other end, so that a setting height of the flat-type supporting member for the seat cushion is maintained at a predetermined height.

The setting height of one side portion of the flat-type supporting member for the seat cushion is higher than that of one side frame corresponding to the one side portion of the flat-type supporting member for the seat cushion, owing to being supported by the second band member for the seat cushion.

A band member for the seat back to enhance a feeling of support in the vicinity of the body side is disposed on the back face side of the flat-type supporting member for the seat back without being joined to the flat-type supporting member for the seat back.

The aforementioned band member for the seat back is composed including a vertical band member provided along the body side, being connected to the upper frame of the back frame at the upper end and to the pelvis supporting plate at the bottom end respectively.

The aforementioned band member for the seat back further includes a lateral band member connected to the side frame of the back frame along the width direction in the vicinity corresponding to the waist portion.

The aforementioned flat-type supporting member for the seat back and the flat-type supporting member for the seat cushion are composed of a two-dimensional net member or a three-dimensional net member.

BRIEF DESCRIPTION OF THE DRAWINGS

FIG. 1 is a schematic perspective view showing a seat structure relating to a first embodiment of the present invention, seen from front;

FIG. 2 is a schematic perspective view showing the seat structure relating to the first embodiment of the present invention, seen from back;

FIG. 10 is a schematic perspective view showing a seat structure relating to a second embodiment of the present invention, seen from front;

FIG. 18 is a graph showing a vibration transmission rate of the seat structures relating to the first and second embodiments and the comparison example; and FIG. 19 is a graph showing a vibration transmission rate of the seat structures relating to the first embodiment and the comparison example when running in a laden state.

DETAILED DESCRIPTION OF THE PREFERRED EMBODIMENT(S)

Figure 3:
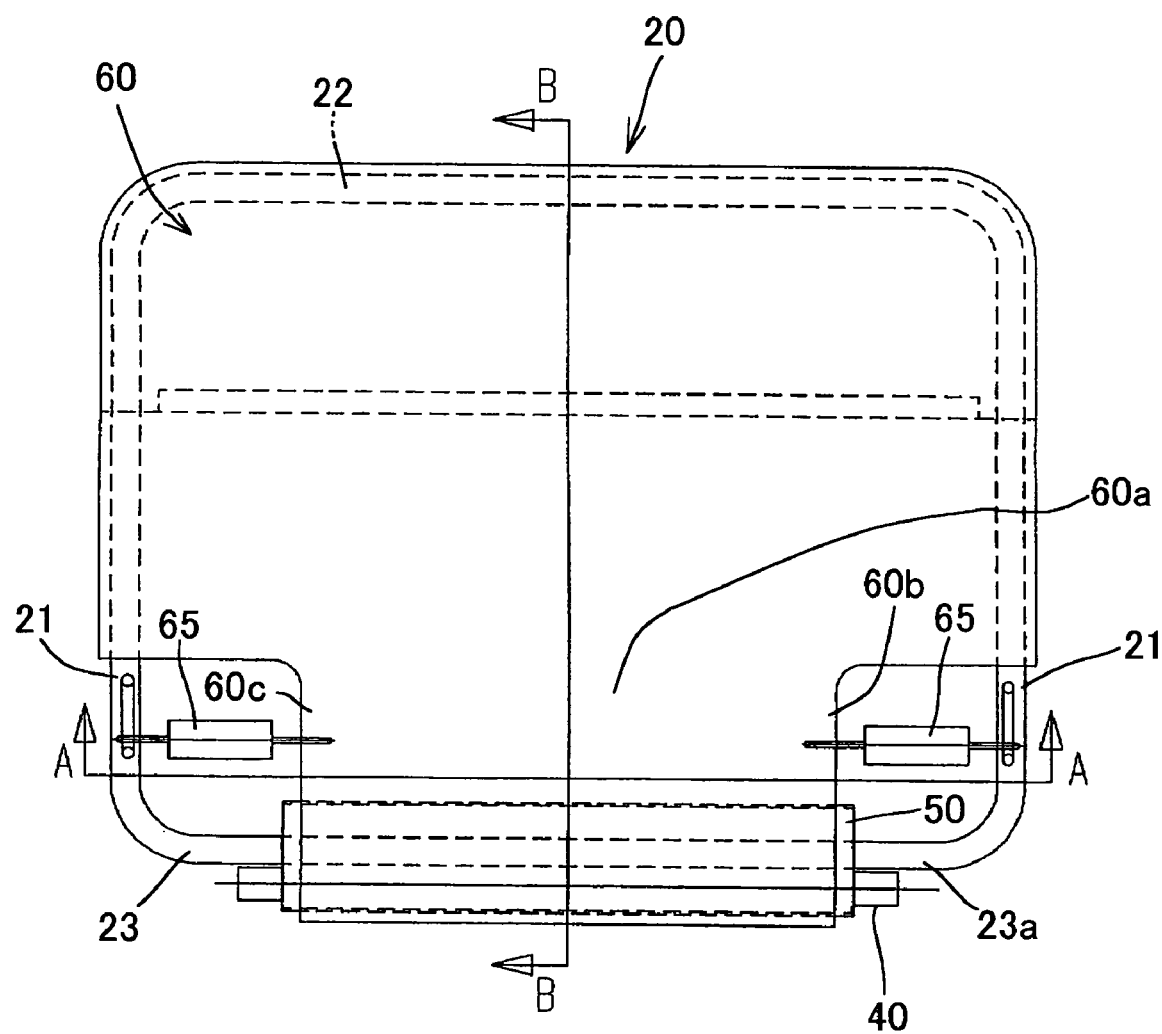
FIG. 3 is a front view of the seat structure relating to the first embodiment in a state that a flat-type supporting member for the seat back is strained on a back frame of the seat structure.
Figure 4:
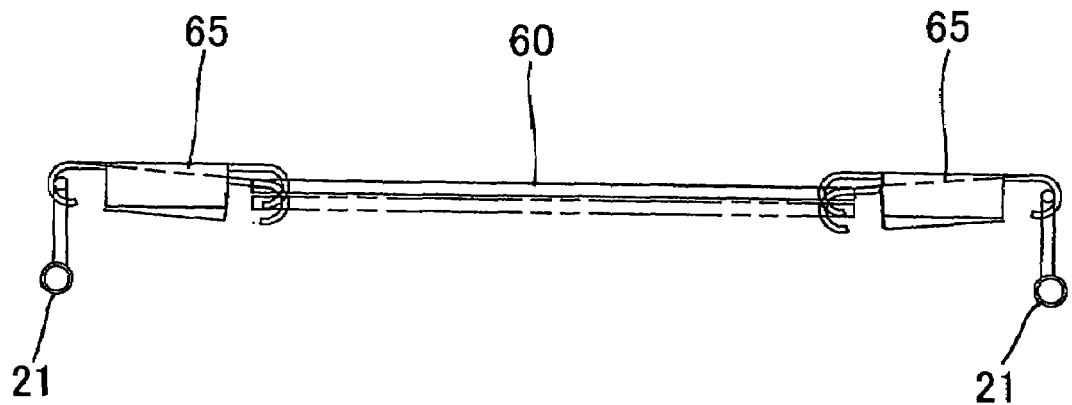
FIG. 4 is a sectional view along a line A—A in FIG. 3.

The present invention will be explained hereinafter in further detail based on the embodiments shown in the drawings. FIG. 1 to FIG. 10 are views showing a first embodiment of the present invention, and among them, FIG. 1 is a perspective view of a seat structure 10 of the present embodiment seen from front, and FIG. 2 is a perspective view of the seat structure 10 seen from back. As shown in these drawings, the seat structure 10 of the present embodiment is structured including a back frame 20 forming a seat back and a cushion frame 30 forming a seat cushion.

Figure 5:
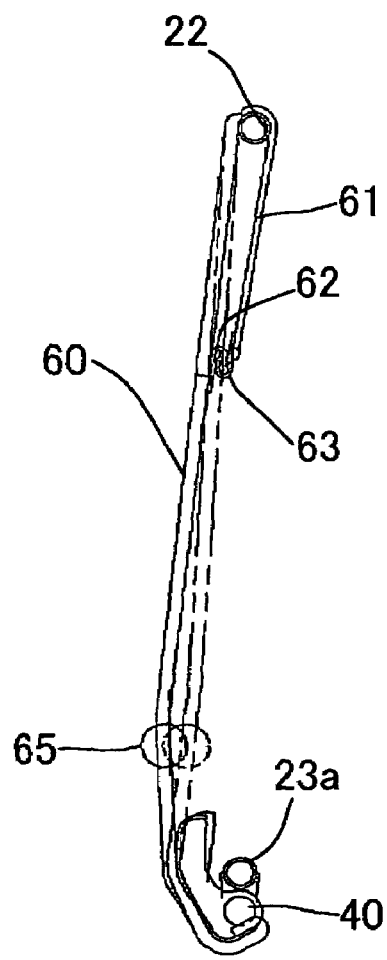
FIG. 5 is a sectional view along a line B—B in FIG. 3.

In more detail, the back frame 20 is structured including a pair of side frames 21 and 21, an upper frame 22, and a bottom frame 23, which form substantially a square seen from front, as shown in FIG. 3. The bottom frame 23 is formed substantially in the letter of U as shown in FIG. 2 and FIG. 5, and its horizontal portion 23a is arranged to be positioned in the rear of the positions where respective side frames 21 and 21 are disposed. On the horizontal portion 23a of the bottom frame 23, attachment plates 23b and 23c protruding downward are protrudely arranged at a predetermined interval as shown in FIG. 2, so that a torsion bar 40 is supported by the attachments plates 23b and 23c. In other words, one end portion 41 of the torsion bar 40 is fixedly supported by one attachment plate 23b while the other end portion 42 is axially supported in a manner to be rotatable by the other attachment plate 23c. Accordingly, the other end portion 42 is twisted with respect to the end portion 41, so that a predetermined elastic force is served.

A pelvis supporting plate 50 is attached to the torsion bar 40. The pelvis supporting plate 50 is formed of a plate having predetermined width and length, and arranged its width direction along the width of the back frame 20 and the length direction along the vertical direction of the back frame 20. Respective end portions in the width direction in the vicinity of the bottom end which is the base end portion are integrally fixed to respective end portions 41 and 42 of the torsion bar 40 respectively, and the pelvis supporting plate 50 are enforced to be pushed out forward in a normal state by the restoring force of the torsion bar 40. The pelvis supporting plate 50 is preferably formed in a curved shape so that a middle portion between the upper end and the bottom end is pushed out forward as shown in FIG. 2 and FIG. 5 in order to reduce a feeling of something foreign felt by a seated person. Further, the shape of the cross section along the width direction (lateral sectional shape) is preferably formed in a curved shape in which nearly central portion in the width direction is pushed out backward. Thereby, keeping ability of the pelvis portion of a human body is enhanced and a stable posture can be kept. Further, a metal plate can be used as the pelvis supporting plate 50, but it is preferable to use plastic, a three-dimensional net member, a two-dimensional net member, or rubber for at least a portion of the pelvis supporting plate 50 to enhance the absorbency of the impact energy by the pelvis supporting plate 50 itself, as will be described later.

It should be noted that, in the present embodiment, a tension adjusting mechanism to adjust the tension of a flat-type supporting member 60 for the seat back is formed by the above-described torsion bar 40, and the pelvis supporting plate 50 enforced to be pushed out forward in a normal state by the restoring force of the torsion bar.

The flat-type supporting member 60 for the seat back is strained on the back frame 20. The flat-type supporting member 60 for the seat back is engaged with the vicinity of the bottom end of the above-described pelvis supporting plate 50 at the bottom end thereof, and strained by hanging on the upper frame 22 at the upper end thereof. As for the upper frame 22, the upper end of the flat-type supporting member 60 for the seat back is hung on the upper frame 22 as it is, and the upper end is allowed to engage with the back surface of the flat-type supporting member 60 for the seat back via an arbitrary engaging means. However, it is acceptable to arrange the flat-type supporting member 60 for the seat back connected with a fabric spring 61 at the upper end thereof to supplement the elasticity of the flat-type supporting member 60 for the seat back. That is, as shown in FIG. 5, the fabric spring 61 is connected to the upper end of the flat-type supporting member 60 for the seat back by sewing or the like, the fabric spring 61 is hung on the upper frame 22 so that the end portion of the fabric spring 61 can be engaged with the back face of the flat-type supporting member 60 for the seat back via an engagement means. Incidentally, as the engagement means, as shown in FIG. 5, for instance, it is possible to use a means in which two sheets of plate members 62 and 63 having a cross section nearly in the shape of the letter U, one of the plate member 62 is fixed on the back face of the flat-type supporting member 60 for the seat back, and the other plate member 63 is fixed at an end of the fabric spring 61 to engage with each other.

The flat-type supporting member 60 for the seat back is thus strained on the back frame 20 vertically. In the present embodiment, as shown in FIG. 1 to FIG. 3, both sides of the flat-type supporting member 60 for the seat back are connected to both sides of the fabric spring 61 positioned on the back face side of the flat-type supporting member 60 for the seat back by sewing or the like to form a bag, and are engaged with respective side frames 21 and 21 forming the back frame 20.

It is preferable to provide a lumber support means on a portion corresponding to the waist portion of a seated person in the flat-type supporting member 60 for the seat back. The structure of the lumber support means is not limited, but in the present embodiment, the width of the flat-type supporting member 60 for the seat back on the portion 60a corresponding to the waist portion of a seated person is formed shorter than the space between respective side frames 21 and 21, and the lumber support means is composed of respective side portions 60b and 60c, and a coil spring 65 disposed between respective side frames 21 and 21. By enforcing respective side portions 60b and 60c to be pulled toward respective side frames 21 and 21, the portion 60a corresponding to the waist portion presses the waist portion of a seated person moderately and supports the waist.

A two-dimensional net member or a three-dimensional net member can be used for the flat-type supporting member 60 for the seat back. For the two-dimensional net member, for instance, a cloth composed of yarn containing elastic yarn such as polyester elastomer fibers or polyurethane fibers as either the warf or the weft, and yarn containing common yarn such as nylon fibers or polyester fibers which are less elastic than the elastic yarn as the other can be used. For the three-dimensional net member, for instance, a solid knitted fabric formed by using a double Raschel knitting machine or the like, and knitted by reciprocating connecting yarns between a pair of ground knitted fabrics positioned at a predetermined distance is used.

Normally, the flat-type supporting member 60 for the seat back is not used as a cushioning layer for a surface layer leaving it as it is, but on the flat-type supporting member 60 for the seat back, a cushioning layer as the surface layer such as a solid knitted fabric or a urethane material is separately layered to cover respective frames such as the side frames 21 and 21. Namely, the flat-type supporting member 60 for the seat back of the present embodiment is normally used for forming a cushioning layer as a base layer, supporting the cushioning layer which is the surface layer such as the solid knitted fabric or the urethane material to serve as a spring structure such as vibration absorbency, impact absorbency, and the like and the flat-type supporting member 60 for the seat back is not limited to the above-described two-dimensional net member or three-dimensional net member as long as it has such a function.

Figure 6:
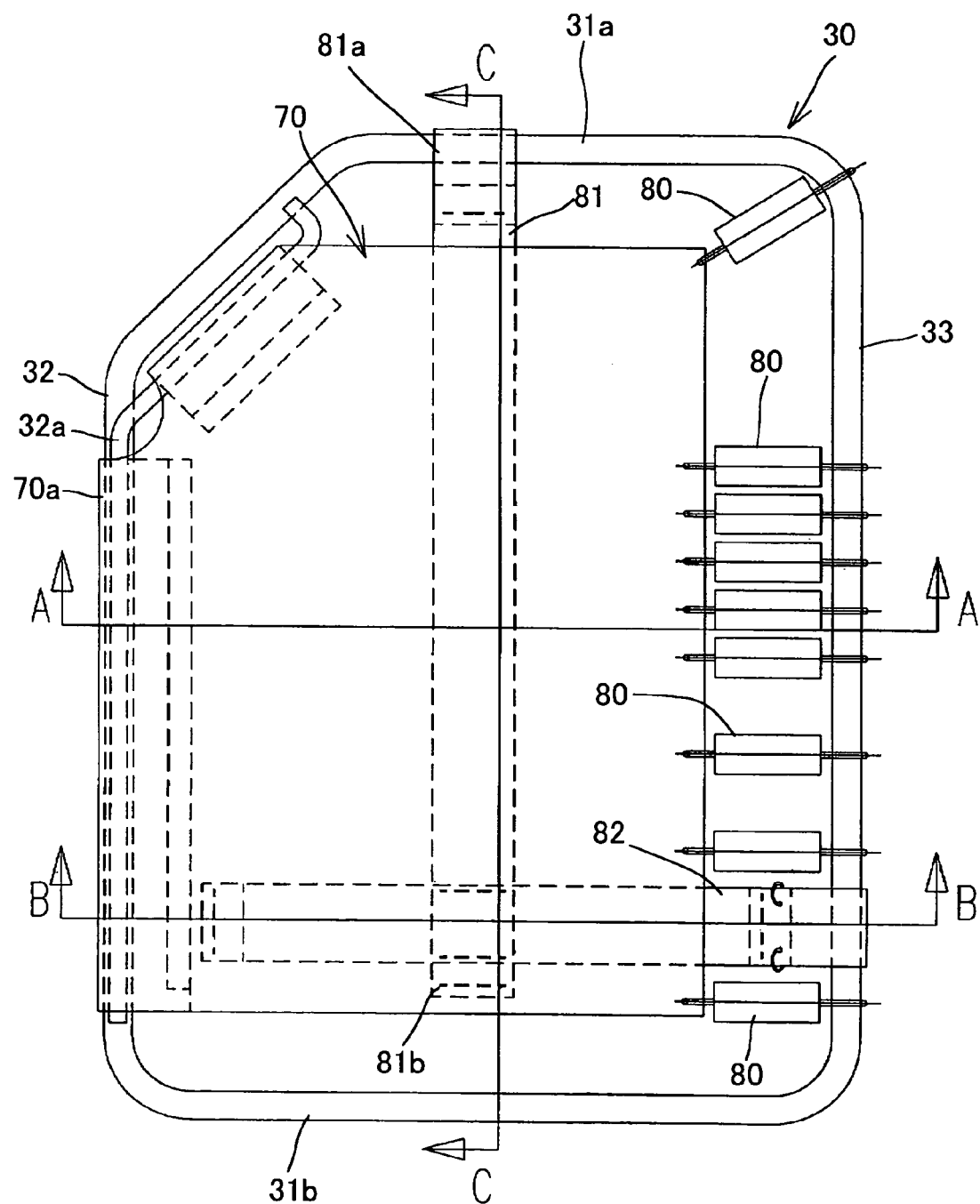
FIG. 6 is a plane view of the seat structure relating to the first embodiment in a state that a flat-type supporting member for the seat cushion is strained on a cushion frame of the seat structure.
Figure 7:
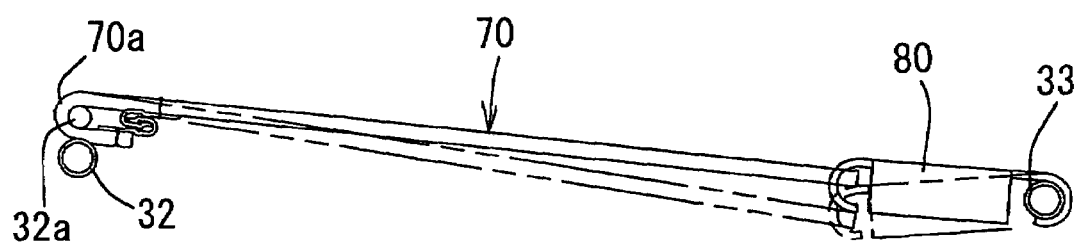
FIG. 7 is a sectional view along a line A—A in FIG. 6.
Figure 8:
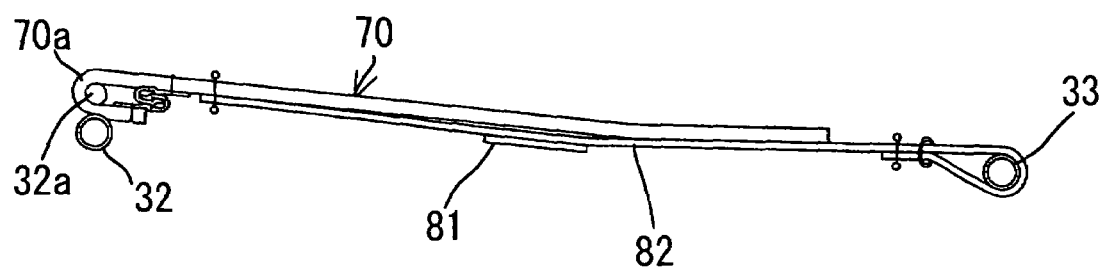
FIG. 8 is a sectional view along a line B—B in FIG. 6.

The cushion frame 30 is formed of side frames 31a and 31b, a front frame 32, and a rear frame 33 into nearly a square, as shown in FIG. 6. In the cushion frame 30, a flat-type supporting member 70 for the seat cushion is elastically supported separately from the pelvis supporting plate 50 and the flat-type supporting member 60 for the seat back. More specifically, a front end portion 70a of the flat-type supporting member 70 for the seat cushion forms a portion of the front frame 32, as shown in FIG. 7 and FIG. 8, and is engaged with a front auxiliary frame 32a disposed along the front frame 32, and a rear end portion 70b is supported by the one end of plural pieces of coil springs 80 as a spring member engaged with the rear frame 33 at the other end of the coil spring 80.

Thus, it is preferable for the flat-type supporting member 70 for the seat cushion to be elastically supported by the cushion frame 30 independently from the pelvis supporting plate 50 and the flat-type supporting member 60 for the seat back separately in view of absorbing difference in physique and difference in posture. Incidentally, the flat-type supporting member 70 for the seat cushion is formed of a two-dimensional net member or a three-dimensional net member similarly to the above-mentioned flat-type supporting member 60 for the seat back.

The flat-type supporting member 70 for the seat cushion supports a cushioning layer, or the surface layer, such as a solid knitted fabric or a urethane member disposed on the flat-type supporting member 70 for the seat cushion with a spring function by being supported elastically as described above to carry out a vibration absorbing function and an impact absorbing function, and a spring member to support the flat-type supporting member 70 for the seat cushion elastically is not limited to any particular member. It is possible to make a structure in which for instance, a torsion bar (not shown) different from the torsion bar 40 which supports the above-described pelvis supporting plate 50, is supported by the rear frame 33 of the cushion frame 30, a frame member (not shown) for supporting a rear end portion is disposed to the torsion bar in the width direction via an arm member (not shown), and the rear portion of the flat-type supporting member 70 for the seat cushion is connected to this frame member so that the rear end portion of the flat-type supporting member 70 for the seat cushion is enforced backward in a normal state by an elastic force of the torsion bar.

Figure 9:
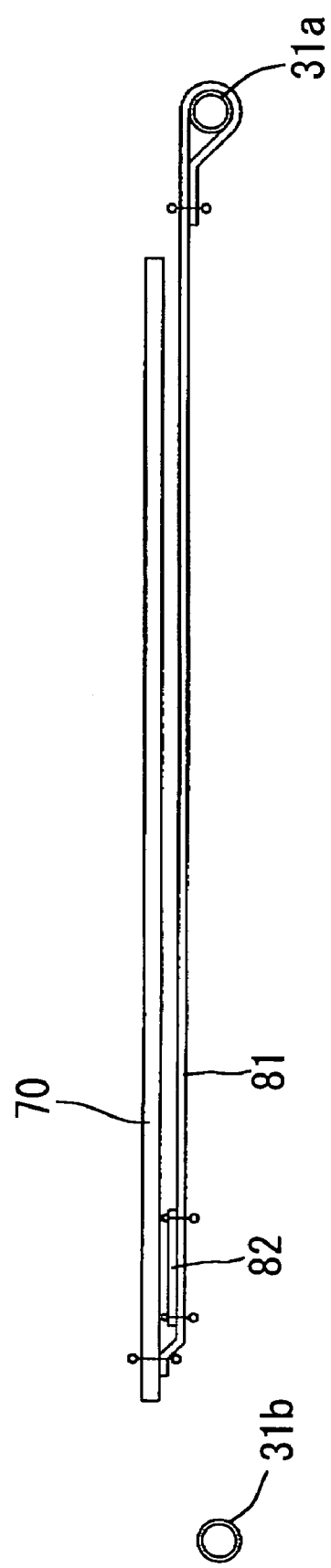
FIG. 9 is a sectional view along a line C—C in FIG. 6.

Further, in order to restrain large depression of the flat-type supporting member 70 for the seat cushion and adjust the spring force, a band member, in addition to the above-described coil spring 80, may be layered on the flat-type supporting member 70 for the seat cushion and engaged with the cushion frame 30. In the present embodiment, as shown in FIG. 6, FIG. 8 and FIG. 9, a first band member 81 for the seat cushion is layered along the width direction of the cushion frame at nearly central portion from front to rear of the flat-type supporting member 70 for the seat cushion, preferably on a position where an end edge of the first band member 81 for the seat cushion places 130 mm to 150 mm front from the rear frame 33. The first band member 81 for the seat cushion is engaged with one side frame 31a of the cushion frame 30 at one end 81a, and the other end 81b is connected to the vicinity of the other side portion of the flat-type supporting member 70 for the seat cushion by sewing or the like. As a result, when a person takes a seat, a portion between the first band member 81 for the seat cushion disposed in nearly central portion from front to rear of the flat-type supporting member 70 for the seat cushion and the rear frame 33 tends to bend, a portion where amount of the bend is restrained by the first band member 81 for the seat cushion serves as a dam so that forward slippage of the haunches is restrained to make a seating position stable. Further, the first band member 81 for the seat cushion is engaged with one side frame 31a at the one end 81a, and it is only the other end 81b which is connected to the flat-type supporting member 70 for the seat cushion. In other words, out of portions overlapped with the flat-type supporting member 70 for the seat cushion, portions excepting the other end 81b are not fixed. Accordingly, since the middle portion of the first band member 81 for the seat cushion can move in a manner to shift from front to rear, even when a person with a big physique takes a seat, a position in which the amount of bending is maximum can be adjusted between the first band member 81 for the seat cushion and the rear frame 33 so as to absorb the difference in physique.

Further, as shown in FIG. 6, FIG. 8 and FIG. 9, a second band member 82 for the seat cushion is disposed in layers from front to rear of the cushion frame 30 on the back face of a side portion near the other side frame 31b in the flat-type supporting member 70 for the seat cushion. The second band member 82 for the seat cushion is engaged with the rear frame 33 at one end 82b and the other end 82b is connected to the vicinity of the front portion of the flat-type supporting member 70 for the seat cushion by sewing or the like. By arranging such a second band member 82 for the seat cushion, the side portion near the other side frame 31b in the flat-type supporting member 70 for the seat cushion becomes nearly the same in its set height as the height of the rear frame 33. It should be noted that portions excepting the other end 82b out of the second band member 82 for the seat cushion may be connected partially to the flat-type supporting member 70 for the seat cushion by sewing or the like. By being connected partially, its relative movement to the flat-type supporting member 70 for the seat cushion can be secured to contribute to absorb difference in physique. By disposing the second ban member 82 for the seat cushion and the first band member 81 for the seat cushion as above, it makes a relative movement between respective band members 81, 82 for the seat cushion and the flat-type supporting member 70 for the seat cushion, so that pressure deformation of the haunch muscle placed over the flat-type supporting member 70 for the seat cushion is restrained even when acceleration to the haunches by an outside input is increased, thereby vertical vibration is transformed into horizontal vibration effectively to disperse the vibration.

Here, the height of the cushion frame 30 in the present embodiment is designed to be high with respect to the setting surface of the one side frame 31a, so that the height of the other side frame 31b becomes relatively low. The purpose of this design is to not give a person sitting on the bordering portion between the two seat structures 10 a feeling of something hard and foreign coming from the other side frame 31b positioned on the bordering portion, when a seat having a similar structure to the seat structure 10 of the present embodiment, arranged symmetrically adjacent to the other side frame 31b is used as a seat for more than one person. This sort of bilaterally symmetrical arrangement of the two seat structures 10 is conducted for the case of a structure, in which, like the third seat of a one-box car or an recreational vehicle, upon tilting the back frame 20 down and forward on the cushion frame 30, the other side frame 31b side is lifted, and rotated around the one side frame 31a, so that the seat comes near the side face of the car body. In such a case, if the height of the side portion near the other side frame 31b in the flat-type supporting member 70 for the seat cushion is set to the same height as the other side frame 31b, a seated person will still feel a feeling of something hard and foreign caused by the other side frame 31b. On the other hand, when the second band member 82 for the seat cushion is arranged as above, since the flat-type supporting member 70 for the seat cushion is higher in set height than that of the other side frame 31b, a feeling of hard touch felt by a person who takes on the bordering portion can be reduced with a simple structure.

It should be noted that the back frame 20 and the cushion frame 30 described above can be assembled together via a bracket 90, a bolt or the like. Such as reclining mechanism and a mechanism to bring the back frame 20 down and forward to the cushion frame 30, or the like can be provided appropriately.

According to the seat structure 10 of the present embodiment, the flat-type supporting member 60 for the seat back takes a state of being pushed forward by the pelvis supporting plate 50 enforced by the torsion bar 40 forming a tension adjusting mechanism, so that it supports to enhance tension of the flat-type supporting member 60 for the seat back. Accordingly, the flat-type supporting member 60 for the seat back, the three-dimensional net member or the like disposed to cover the flat-type supporting member 60 for the seat back can be prevented from giving an impression of making slight slack in the vicinity of the waist portion.

On the other hand, in the flat-type supporting member 70 for the seat cushion, since a portion between the first band member 81 for the seat cushion disposed on nearly central portion from front to back along the width direction of the cushion frame and the rear frame 33 is in a state of highest depression, a portion corresponding to the first band member 81 for the seat cushion serves as a dam to restrain positional displacement of the haunches towards front, so that stable seating posture can be maintained. Further, in the case of two seats having the seat structure 10 according to the present embodiment being placed right and left with each other, even when a person sits on the bordering portion of both seats, since the flat-type supporting member 70 for the seat cushion is maintained in a predetermined set height owing to the second band member 82 for the seat cushion, the feeling of hard touch caused by the other side frame 31b is restrained.

Further, the torsion bar 40 and the pelvis supporting plate 50 forming a tension adjusting mechanism support in a manner that tension of the flat-type supporting member 60 for the seat back can be enhanced at no load, as described above. However, when a person takes a seat, the tension of the felt-type supporting member 60 for the seat back becomes low, because the pelvis supporting plate 50 is pushed backward by the back of the seated person against an elastic force of the torsion bar 40. That is, by providing the tension adjusting mechanism like that of the present embodiment, at the time of no load, a relatively high tension can give to prevent slight slack of the flat-type supporting member 60 for the seat back, in the meantime, at the time of seated, tension of the flat-type supporting member 60 for the seat back is relatively lowered, so that a damping ratio due to the flat-type supporting member 60 made of a two-dimensional net member or a three-dimensional net member can be increased more than that at the time of no load.

In addition, in the present embodiment, the front end portion 70a of the flat-type supporting member 70 for the seat cushion is directly supported by the front auxiliary frame 32a forming a portion of the front frame 32, while the rear end portion 70b is supported by the rear frame 33 via spring members such as the coil spring 80 or the like. Accordingly, at the time of no load, the tension of the flat-type supporting member 70 for the seat cushion is relatively high owing to such a coil spring 80, but when a person takes a seat, since the coil spring 80 is extended, the tension of the flat-type supporting member 70 for the seat cushion becomes relatively low. By supporting the flat-type supporting member 70 for the seat cushion in this manner, when a person takes a seat, the flat-type supporting member 70 for the seat cushion becomes higher in damping ratio than that at the time of no load. Therefore, the spring members such as the coil spring 80, a torsion bar, and the like supported by the rear frame 33 of the cushion frame 30 function as a tension adjusting mechanism for the flat-type supporting member 70 for the seat cushion.

Figure 11:
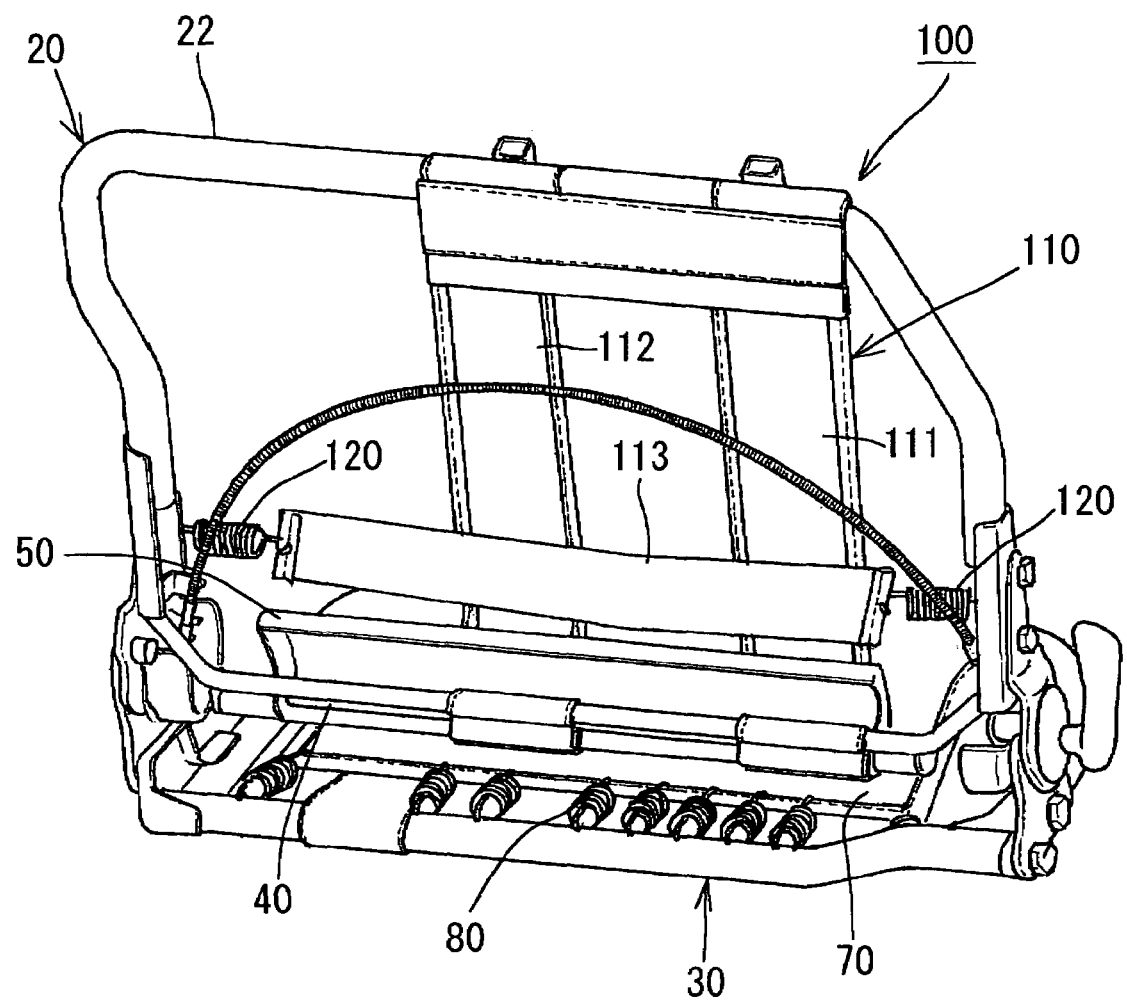
FIG. 11 is a schematic perspective view showing the seat structure relating to the second embodiment of the present invention, seen from back.

FIG. 10 and FIG. 11 are views showing a seat structure 100 relating to a second embodiment of the present invention. In the present embodiment, the structure of the second embodiment is all the same as the first embodiment except that a band member 110 for the seat back which moves together with the movement of the pelvis supporting plate 50 is supported by the back frame 20. Incidentally, in the drawings, the same members as those used for the seat structure in the first embodiment are shown with the same numerals and symbols.

In the present embodiment, the band member 10 for the seat back is composed of: two vertical band members 111 and 112 positioned corresponding to the vicinity of the body side at a predetermined interval to each other, and connecting the bottom end thereof to the bottom end of the pelvis supporting plate 50, while connecting the upper end thereof to the upper frame 22 of the back frame 20; and a lateral band member 113 provided on respective side frames 21, 21 of the back frame 20 via coil springs 120 at a position corresponding to the vicinity of the waist portion. Note that the lateral band member 113 are disposed on the back faces of the vertical band members 111 and 112. The flat-type supporting member 60 for the seat back is provided to cover the band member 110 for the seat back, and similarly to the first embodiment described above, a cushioning layer made of a three-dimensional net member, a two-dimensional net member, a thin urethane material, or the like is provided as a tension structure. Incidentally, the vertical band members 111, 112, and the lateral band member 113 which form the band member 110 for the seat back are preferably disposed without connecting to the flat-type supporting member 60 for the seat back. Thereby, a room to generate a relative movement comes into existence between the flat-type supporting member 60 for the seat back and the band member 110 for the seat back so as to contribute to absorb difference in physique and to transform inputted vertical vibration into horizontal vibration effectively, so that the vibration can be dispersed.

With such a structure, the vertical band members 111 and 112 move together with movement of the pelvis supporting plate 50, and by moving-together of the vertical band members 111 and 112, the lateral band member 113 further moves together, which results in the elastic force of the torsion bar 40 supporting the pelvis supporting plate 50 affecting in a wide range, so that vibration energy can be dispersed effectively. Since the vertical band members 111 and 112 are disposed in the vicinity of the body side from the pelvis to the upper portion of the scapula, supportability of the side portion of the upper body is improved and when a cushioning layer of the three-dimensional net member or the like is strained on the back frame 20 to structure as a tension structure, a feeling of sitting on a hammock can be reduced. A structure in which the vertical band members 111 and 112 supported by the pelvis supporting plate 50 and the lateral band member 113 supported by the coil spring 120 are layered can be taken for a structure in which plural spring members are layered, and acceleration inputted into the human body can be effectively reduced. In addition to that, since the vertical band members 111 and 112 are disposed corresponding to the vicinity of the body side, a portion positioned between the vertical band members 111 and 112 out of the flat-type supporting member 60 for the seat back disposed so as to cover the band member 110 for the seat back is tend to bend. Since the backbone of a seated person is positioned on a portion between the vertical band members 111 and 112, a structure can be realized in which movement of the backbone is not disturbed, and fatigue is not likely to be accumulated though the supportability in the vicinity of the body side is increased.

Incidentally, the band member 110 for the seat back is sufficient so long as it has the above-described function, and not limited to the examples shown in the drawings. For instance, in FIG. 10 and FIG. 11, the vertical band members 111 and 112 are strained almost vertically, but it is possible to dispose them to expand nearly in a shape of the letter V from the bottom end connected to the pelvis supporting plate 50. However, it is preferable to make a structure as shown in FIG. 10 and FIG. 11 from the point of taking the balance between the support in the vicinity of the body side and the movability in the vicinity of the backbone more appropriately.

(Test Example)

Figure 12:
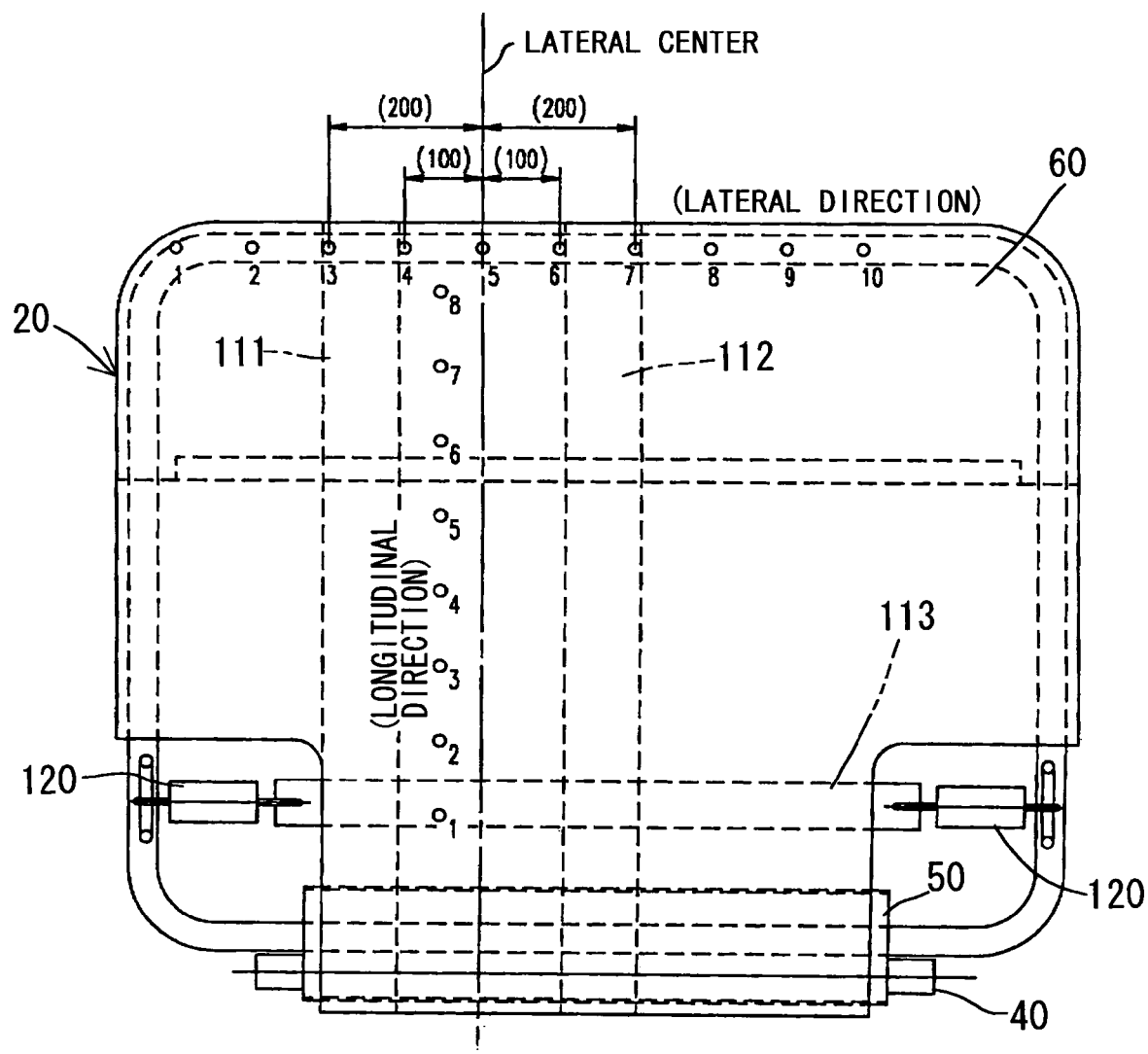
FIG. 12 is a view showing measurement points when partial stiffness of the seat back of the seat structure relating to the second embodiment are measured.
Figure 13:
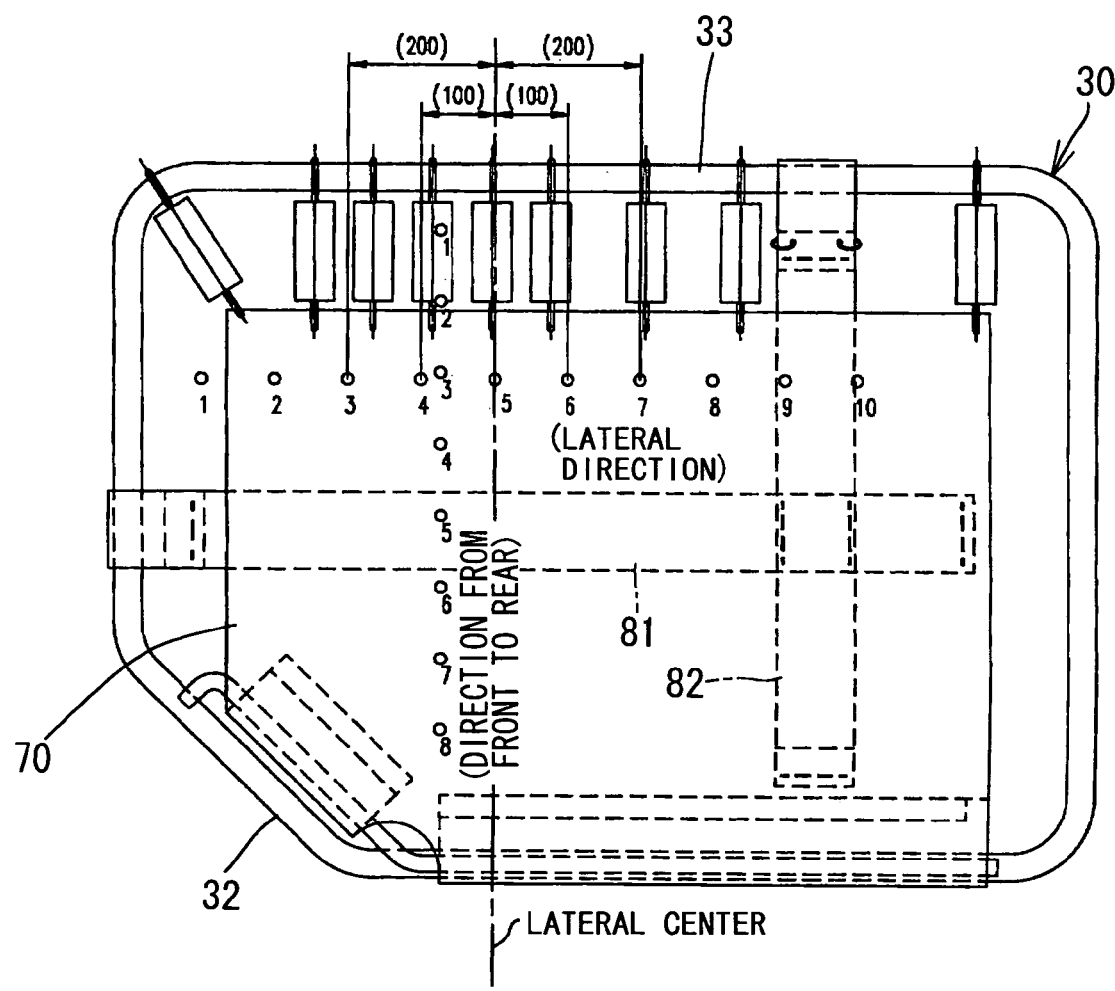
FIG. 13 is a view showing measurement points when partial stiffness of the seat cushion of the seat structure relating to the second embodiment are measured.

The partial stiffness of the seat back and the seat cushion of the seat structure 100 relating to the second embodiment described above are measured. Incidentally, the structure of the seat cushion is the same as the seat structure 10 according to the first embodiment, as described above. On the upper layer of the flat-type supporting member 60 for the seat back and the upper layer of the flat-type supporting member 70 for the seat cushion, three-dimensional net members (manufactured by ASAHI KASEI) made of a solid knitted fabric having the thickness of 15 mm are stained at the rate of elongation of 5% or less respectively, and to the measurement points shown in FIG. 12 (seat back) and FIG. 13 (seat cushion), the amount of displacement is measured when applied a pressure to 20 kg for the seat cushion and to 10 kg for the seat back using a pressure board of 98 mm in diameter. The results will be shown in FIG. 14 and FIG. 15.

Figure 14:
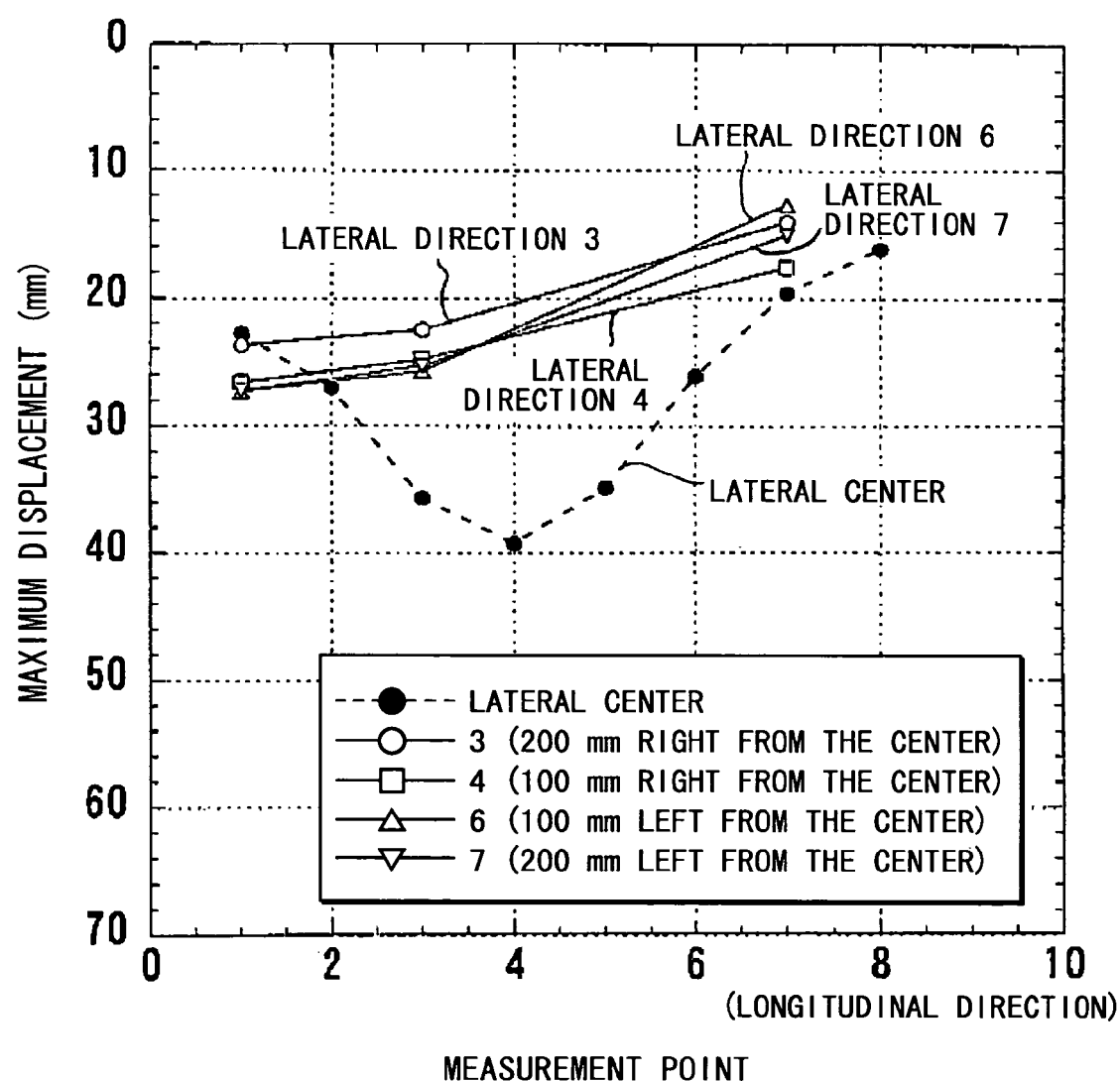
FIG. 14 is a graph showing a measurement result of partial stiffness of the seat back.
Figure 15:
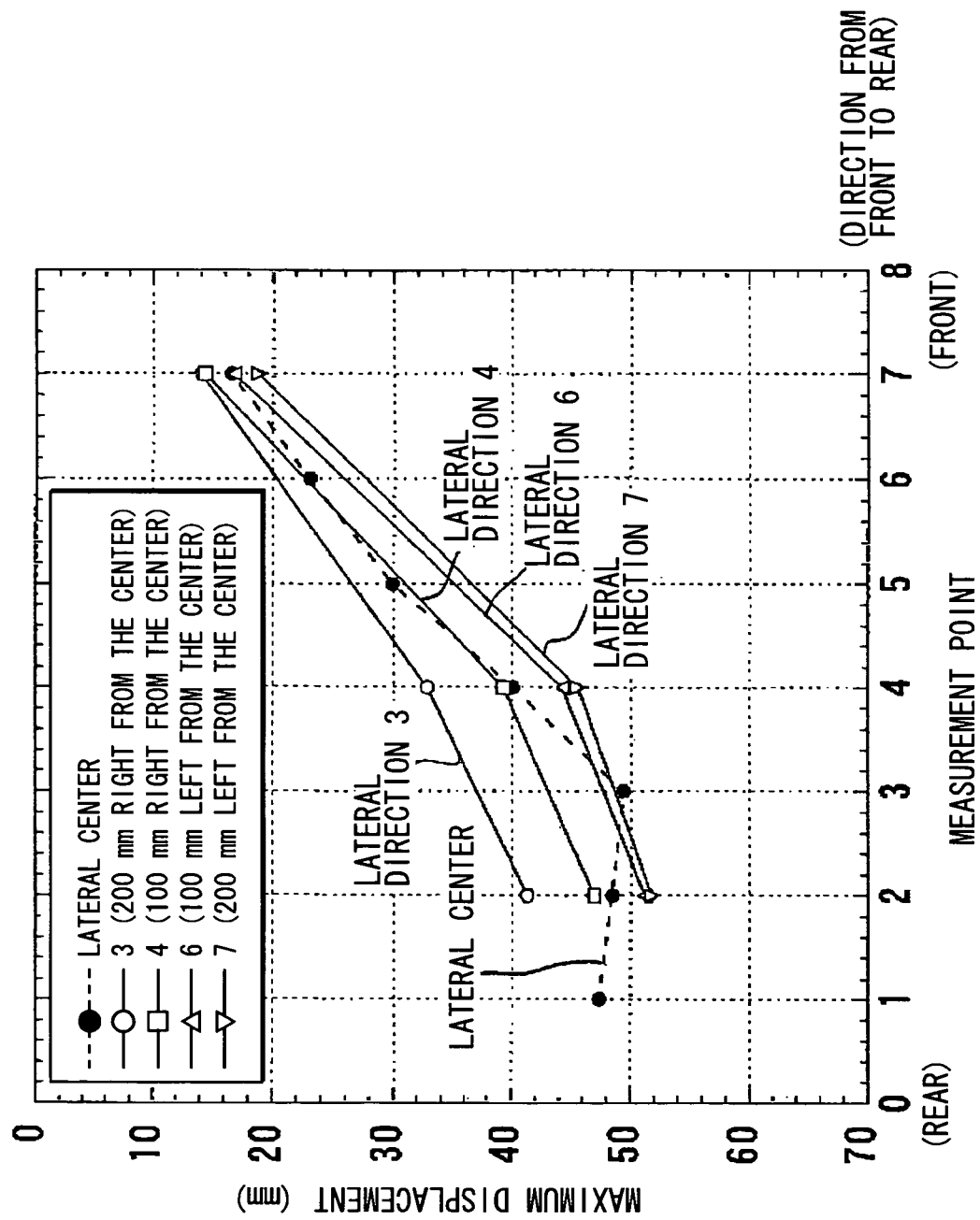
FIG. 15 is a graph showing a measurement result of partial stiffness of the seat cushion.

As shown in FIG. 14, the amount of displacement is small in the vicinity of the body side (lateral direction 3 to 7) where the vertical band members 111 and 112 are positioned, and in the vicinity of a position corresponding to the backbone (lateral center) between the vertical band members 111 and 112, it bends about 20 mm at the maximum more than that in the vicinity of the body side, which shows that it has a structure of supporting the vicinity of the body side without hindering of movement of the backbone. Further, as shown in FIG. 15, in the seat cushion, at a measurement point about 50 mm rear in the direction from rear to front 3, with respect to a measurement point in the direction from rear to front 4 where the first band member 81 for the seat cushion is positioned, amount of displacement at the center in the lateral direction is at the maximum. It is found from the fact described above, a portion between the first band member 81 for the seat cushion and the rear frame 33 bends most extremely, prevents rotation of the pelvis, makes seating posture stable and reduces a feeling of being stooped.

Next, a load-displacement characteristic of the seat structure 100 according to the above-described second embodiment and the seat structure 10 according to the first embodiment in which the same three-dimensional net member as described above is disposed under the same condition is studied by pressurizing to 500 N on a position 180 mm far from a hip point on the seat back at a speed of 4.5 mm/s, using a board for press having a shape of the haunches. Further, a load-displacement characteristic for the seat cushion is studied under the same condition by pressurizing to 1000 N on the hip point of the seat cushion. Nearly the same seat as a seat for a motor vehicle generally used conventionally prepared by disposing a pad member (12 kgf/JIS K 6400 in hardness) made of urethane having the thickness of 30 mm for the seat back, and a pad member (22 kgf/JIS K 6400 in hardness) made of urethane having the thickness of 30 mm in the vicinity of the front edge, and 65 mm in the vicinity of the haunches supporting portion for the seat cushion, on the same frame structure as those in the first and second embodiments described above is used as a comparison example. The result is shown in FIG. 16 and FIG. 17.

Figure 16:
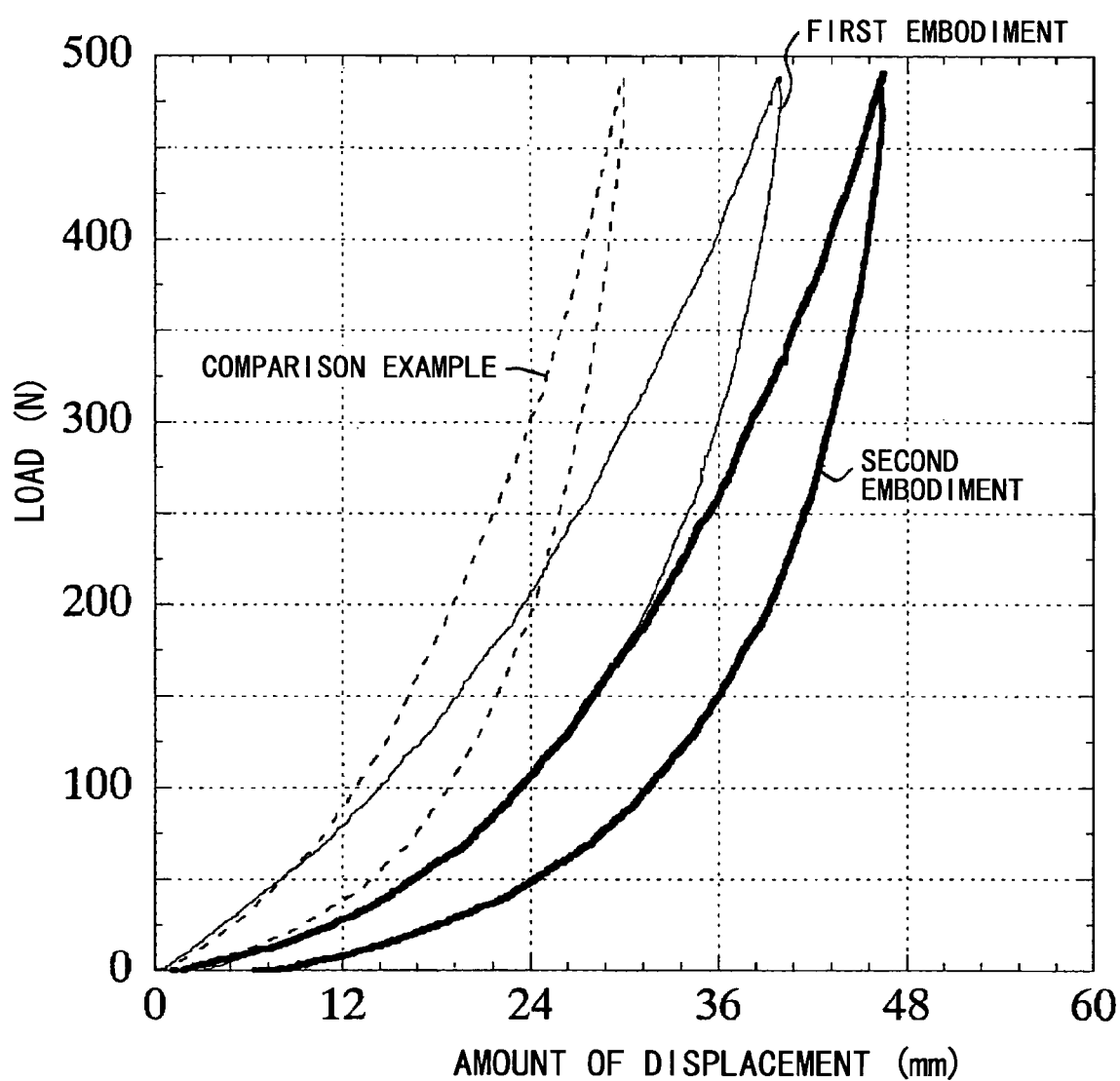
FIG. 16 is a graph showing a load-displacement characteristic of the seat back of the seat structures relating to the first and second embodiments and that of the comparison example.
Figure 17:
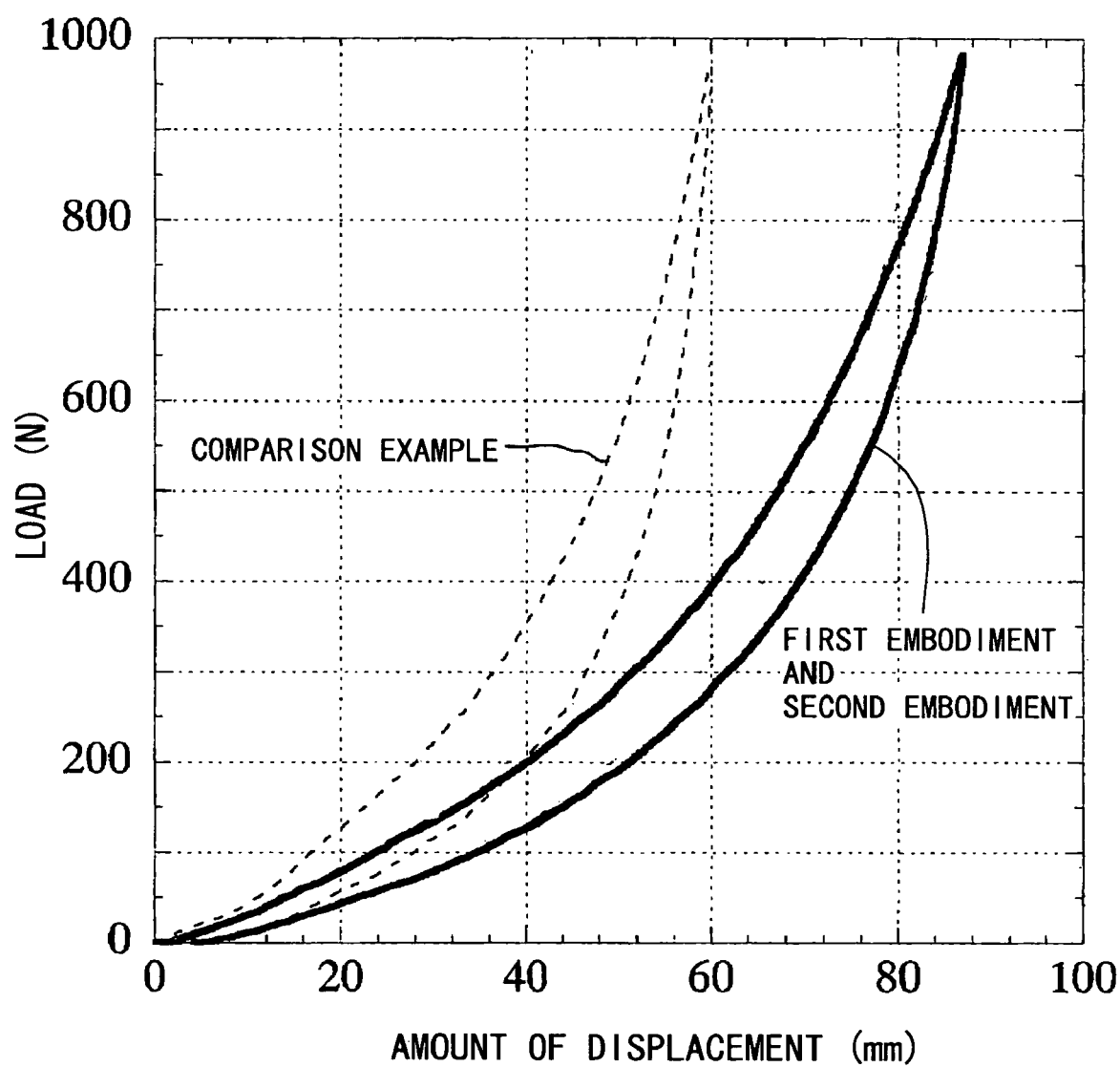
FIG. 17 is a graph showing a load-displacement characteristic of the seat cushion of the seat structures relating to the first and second embodiments and that of the comparison example.

As shown in FIG. 16, in the seat back, the seat structures 10 and 100 of the first and second embodiments are smaller in spring constant shown as a slope in the drawing than the seat structure of the comparison example, which shows that it comes to a structure in which the counterforce to the human body is reduced. From this fact, it is found that the seat structures 10 and 100 in the first and second embodiments can maintain a continuous face to support the posture even when the stroke is increased, and not easily generates a feeling of bottom touch when compared with the case of using the pad material made of urethane in the comparison example. Further, as clear from FIG. 17, in the seat cushion, the seat structures 10 and 100 in the first and second embodiments are also smaller in spring constant than the seat structure of the comparison example and takes a structure having a reduced counterforce. Incidentally, structures of the seat cushions in the seat structures 10 and 100 according to the first and second embodiments are the same structure as described above, and have no significant difference.

Thus, in the case of the seat structures 10 and 100 of the first and second embodiments, it is found that a portion corresponding to a space serving as the residual thickness portion of the pad member made of urethane becomes unnecessary, a substantial stroke can be made longer than that in the comparison example. Further, since the portion corresponding to a space serving as a residual thickness portion of the pad member made of urethane can be made unnecessary, both the seat back and the seat cushion can be made thinner than that when a pad member made of urethane is used. Accordingly, it is particularly effective, for instance, when a seat back is used as a seat to be able to tilt down toward the seat cushion such as a third seat in a one-box car or an recreational vehicle, because the thickness at the time of being folded can be made thin so that increase of a baggage room can be realized.

Next, a sine wave was inputted at an amplitude of 1 mm on one side (amplitude between peaks 2 mm) from a lower portion of the tuber ischiadicum to the seat structures 10, 100 according to the above-described first, second embodiments and the seat structure of the comparison example, an acceleration sensor was attached on the waist portion and the shoulder portion of a seated person and the vibration transmission rate was measured. The result is shown in FIG. 18.

As seen clearly from FIG. 18, it is found that the seat structures 10 and 100 according to the first and second embodiments are drastically reduced in vibration transmission rate, especially in vibration transmission rate in the region of high frequency, compared with the seat structure of the comparison example. Besides, when the seat structures 10 and 100 in the first and second embodiment are compared, the seat structure 100 according to the second embodiment was found that the vibration transmission rate especially on the shoulder portion was reduced on a large scale. From this fact, it is found that the effect of an elastic force of the torsion bar 40 supporting the pelvis supporting plate 50 is increased owing to the band member 110 for the seat back disposed on the seat back, so that dispersion efficiency of the vibration energy becomes high.

Further, the seat structure 10 according to the first embodiment and the seat structure of the comparison example are installed in a vehicle, an acceleration sensor is fitted on the waist portion of a seated person, the vehicle travels along a test course, and laden vehicle data of the vibration transmission rate is measured. The result is shown in FIG. 19. As clear from the drawing, the seat structure 10 according to the first embodiment reduces a vibration transmission rate in a high frequency region more than that in the comparison example. When the backbone resonates while riding in a car, an uncomfortable feeling (a feeling created by repeated vertical small quick movements) is apt to be generated. However, the vibration transmission rate of the seat structure 10 according to the first embodiment is 1 or less at 5 Hz which is a resonance point of the backbone, the seat structure 10 does not resonate at such frequency, and the resonance point is about 3 Hz which is lower than that in the comparison example, which shows that the vibration absorbency is improved.

A seat structure of the present invention relates to a structure in which a flat-type supporting member for the seat back is strained on a back frame via a tension adjusting mechanism. Accordingly, vibration inputted from the seat back side and moving as if patting on the back of the human body can be absorbed by an elastic force of a torsion bar or the like forming such a tension adjusting mechanism. That is, since the seat structure of the present invention is a structure having a vibration absorption measure on a seat back side in addition to a vibration absorbing function on a conventional seat cushion side, a vibration absorbing function as a whole seat structure is improved. Further, by providing a tension adjusting mechanism, slight slack created on a flat-type supporting member for the seat back and a cushioning layer provided on the upper layer of the flat-type supporting member together with a tension structure at the time of no load can be restrained to improve the appearance.

Further, by providing a band member for the seat cushion on a predetermined position of a seat cushion, a position for seating can be stabilized, and displacement forward can be restrained, so that a feeling of stooped can be prevented. Further, by providing a band member for the seat back on a predetermined position of a seat back, a feeling of receiving a lateral pressure on a side portion of the body can be restrained. Thereby, a hammock-like feeling generated when a cushioning layer is provided as a tension structure is restrained, posture keeping ability can be improved, a contact area with a human body is increased owing to a band member for the seat cushion and a band member for the seat back, and body pressure dispersibility can be made excellent.

What is claimed is:

1. A seat structure including a back frame and a cushion frame comprising:
   a flat-type supporting member for a seat back supported by said back frame;
   a tension adjusting mechanism for adjusting a tension of said flat-type supporting member for the seat back; and
   a flat-type supporting member for a seat cushion elastically supported by said cushion frame separately from said flat-type supporting member for the seat back;
   wherein said tension adjusting mechanism comprises:
   a torsion bar disposed in a vicinity of a bottom end of said back frame along a width direction of the back frame; and
   a pelvis supporting plate composed of a plate member having predetermined width and length, connectedly disposed with said torsion bar, positioned in a rear of a pelvis of a seated person, and enforced in a direction pushed forward in a normal state, said flat-type supporting member for the seat back is engaged with a vicinity of a bottom end of said pelvis supporting plate at a bottom end thereof, and strained vertically on said back frame by an elastic force of said torsion bar;
   wherein said flat-type supporting member for the seat cushion is engaged with a front frame forming said cushion frame at a front end portion thereof, and elastically supported by a rear frame forming said cushion frame via spring members at a rear end portion thereof, and the spring members act as a tension adjusting mechanism of the flat-type supporting member for the seat cushion;
   wherein a first band member for the seat cushion is provided in layers at nearly central portion from front to back along a width direction on a back face of said flat-type supporting member for the seat cushion, and connected to a vicinity of one side portion of the flat-type supporting member for the seat cushion at one end, and engaged with a side frame corresponding to an other side portion of the flat-type supporting member for the seat cushion at an other end;
   wherein a second band member for the seat cushion is provided in layers in the vicinity of one side portion of said flat-type supporting member for the seat cushion in a direction from front to back, and connected to a vicinity of the front portion of the flat-type supporting member for the seat cushion at least at one end and engaged with the rear frame at an other end, so that a setting height of the flat-type supporting member for the seat cushion is maintained at a predetermined height.

2. The seat structure according to claim 1, wherein said torsion bar is connected to the vicinity of the bottom end of said pelvis supporting plate.

3. The seat structure according to claim 1, wherein said pelvis supporting plate is formed in a curved shape protruding backward at nearly central portion thereof in the width direction.

4. The seat structure according to claim 1, wherein at least a portion of said pelvis supporting plate is formed of synthetic resin, a three-dimensional net member, a two-dimensional net member, or rubber.

5. The seat structure according to claim 1, wherein coil springs are provided between respective side portions corresponding to a waist portion of a seated person on said flat-type supporting member for the seat back and respective side frames forming said back frame to pull the respective side portions corresponding to the waist portion toward respective side frames.

6. The seat structure according to claim 1, wherein a fabric spring is connected to an upper end of said flat-type supporting member for the seat back and hung on an upper frame forming said back frame and an end portion of the fabric spring is fixed to the flat-type supporting member for the seat back on a back face side.

7. The seat structure according to claim 1, wherein said spring member is a coil spring or a torsion bar connected to a rear end portion of said flat-type supporting member for the seat cushion and supported by a rear frame forming said cushion frame.

8. The seat structure according to claim 1, wherein the setting height of one side portion of said flat-type supporting member for the seat cushion is higher than that of one side frame corresponding to one side portion of the flat-type supporting member for the seat cushion, owing to being supported by said second band member for the seat cushion.

9. The seat structure according to claim 1, wherein a band member for the seat back to enhance a feeling of support in a vicinity of a body side is disposed on a back face side of said flat-type supporting member for the seat back without being joined to the flat-type supporting member for the seat back.

10. The seat structure according to claim 9, wherein said band member for the seat back is composed including a vertical band member provided along a body side, being connected to an upper frame of a back frame at an upper end and to said pelvis supporting plate at a bottom end respectively.

11. The seat structure according to claim 10, wherein said band member for the seat back further includes a lateral band member connected to the side frame of the back frame along a width direction in a vicinity corresponding to a waist portion.

12. The seat structure according to claim 1, wherein said flat-type supporting member for the seat back and the flat-type supporting member for the seat cushion are composed of a two-dimensional net member or a three-dimensional net member.

* * * * *